United States Patent [19]

Baker

[11] Patent Number: 5,500,120

[45] Date of Patent: Mar. 19, 1996

[54] AUGER-TYPE CHEMICAL REFORMER

[76] Inventor: David L. Baker, 601 S. Skelton, West Frankfort, Ill. 62896

[21] Appl. No.: 188,708

[22] Filed: Jan. 31, 1994

[51] Int. Cl.$^6$ ................................................. B01D 17/00
[52] U.S. Cl. ...................... 210/179; 210/219; 422/198; 422/273
[58] Field of Search ..................... 210/175, 179, 210/219; 422/187, 198, 273, 285, 287, 291, 307

[56] References Cited

U.S. PATENT DOCUMENTS

| | | | |
|---|---|---|---|
| 3,644,103 | 2/1972 | Yoon et al. | 422/273 |
| 4,636,318 | 1/1987 | Baker | 210/766 |
| 4,842,692 | 6/1989 | Baker | 201/23 |
| 4,842,728 | 6/1989 | Baker | 210/180 |
| 4,923,604 | 5/1990 | Baker | 210/180 |
| 5,269,947 | 12/1993 | Baskis | 210/774 |

OTHER PUBLICATIONS

Book entitled: "An Introduction To Coal Technology by N. Berkowitz", Academic Press, New York (1979).

*Primary Examiner*—Ivars Cintins
*Attorney, Agent, or Firm*—Gerstman, Ellis & McMillin, Ltd.

[57] ABSTRACT

Apparatus for chemical reforming of organic materials comprises a tubular housing having a longitudinal axis, and an open-end tube rotatably positioned in the tubular housing generally parallel to the axis, which tube carries radially extending projections. Also, halogenated, organic compounds may be chemically reformed by the device of this invention.

18 Claims, 2 Drawing Sheets

AUGER-TYPE CHEMICAL REFORMER

BACKGROUND OF THE INVENTION

In Baker U.S. Pat. Nos. 4,636,318; 4,842,692; 4,842,728; and 4,923,604 a chemical reformer is shown in which organic materials such as municipal waste or coal are chemically reformed by pyrolysis in the presence of water to form desirable oils and gasses from solid materials. The flow arrangement is of the continuous process type, using countercurrent heat exchange so that the organic materials, fluidized with an oil carrier, enter the system cool and then are removed from the system in a substantially cool form as well, with the heat being substantially regenerated from processed outgoing materials to unprocessed incoming materials.

By this invention, a simplified apparatus for chemical reforming is provided, capable of performing the desired conversion of organic materials such as municipal solid waste, coal, hazardous chlorinated solvents, plastics, ground up rubber tire material, sawdust, or any other organic material. Thus, in view of the relative simplicity of the apparatus and method of this invention, organic materials, and even materials considered as waste products, can be chemically reformed into mixtures of flammable oils and gasses which may be used as fuel, chemical feed stocks, or for any other desired purpose.

The apparatus can operate on a continuous process, having an inlet for raw materials, and one or more outlets for the product oils, gasses and solids. The reformed products of the apparatus of this invention may be removed from the system in relatively cool form so that heat is regenerated and not wasted. The relative amounts of gas and oils produced can be adjusted throughout a desired range, particularly by control of the maximum temperature achieved by the organic materials as they pass through the apparatus.

The apparatus of this invention is also capable of reforming halogenated plastics and solvents, many of which are considered to be hazardous materials having a significant environmental threat. Such materials can be passed through a pyrolysis apparatus for chemical reforming similar to the apparatus of this invention, to be converted back into simple, non-halogenated organic species of molecules, with the halogens being typically converted back to their less harmful ionic form, for example chloride.

DESCRIPTION OF THE INVENTION

By this invention, apparatus for chemical reforming of organic materials is provided.

The tubular housing having a longitudinal axis contains an open-ended tube which is rotatably positioned in the tubular housing in a manner generally parallel to the longitudinal axis. The open-ended tube carries radially extending projections along essentially the entire length thereof.

Means are provided for rotating the tube, for example a motor and shaft, connected to rotate the tube through means as shown below.

First access port means are positioned adjacent one end of the tube and housing. The first access port means communicates with a tubular space between the tube and housing, although added communication with the bore of the tubing at the same end is not necessarily precluded.

Second access port means are also provided, communicating with the bore of the tube at the one end.

The housing defines means adjacent to the end opposed to the one end, for forming a flow path between (1) the space between the tube and the housing and (2) the bore of the tube. This may be a closed housing end, spaced from the opposed tube end.

Rotation of the tube typically causes fluid material within the housing to move in a path between the first and second access ports. The rotating means is typically set to rotate the tube in a direction to so move the fluid material from the first access port toward the second access port. To accomplish this, in one embodiment, an outer spiral vane first catches fluid, organic material from the first access port and urges it through the space between the tube and housing in a flow path extending from the one end of the tube and housing to the opposite end. Then, the flow path permits the fluid, organic material to move around the opposite end of the tube and to enter the bore, in which an inwardly extending spiral vane, set in the opposite spiral direction, continues to urge the fluid organic material to flow along the tube within the bore thereof back to the one end again, from where the fluid material may pass out of the system through the second access port means. However, if desired, the apparatus may be run in the opposite direction.

Alternatively, the apparatus for chemical reforming of organic materials may comprise a tubular housing having a longitudinal axis as in the previous embodiment, the radially extending projections comprise hollow, radially extending convolutions which define radially extending spaces both inside and outside of the tube, with the tube serving as a heat exchange wall for material being processed as it flows longitudinally along the tube first on one side and then on the other side thereof.

A helical member may be carried on the tube to typically extend essentially along the entire length of the tube. Such a helical member may comprise at least part of the means for causing the fluid material within said housing to move in a path between the first and second access ports. Additionally, pumps may be provided if desired to further facilitate flow of said fluid.

The means for rotating the tube may comprise a motor having a rotary shaft. The tube, in turn, may have a rotary driving shaft which is driven by the rotary shaft, but connected thereto in a manner to permit lateral play therebetween. Thus, the tube exhibits a degree of lateral motion relative to the rotary shaft during rotation.

Specifically, the rotary driving shaft and rotary shaft may each carry a radially extending flange, one of the flanges carrying pins which extend in loosely-fitting manner through apertures of the other of said flanges to permit such lateral play or motion.

Means may be provided for heating the housing adjacent to the opposed end and spaced from the one end. In this circumstance, the fluidized organic material enters into the flow path, preferably passing first along the tube between the tube and the housing toward the heated, opposed end. As the fluid material travels toward the opposed end, fluid material that is heated is traveling again toward the one end through the bore of the tube, in countercurrent flow and heat exchange relationship with the incoming material, so that heat is transferred from the hot, outbound material to the cool, inbound material. Thus, by the time that the inbound material gets to the opposed end of the tube within the housing it is already heated, while by the time the heated material gets back to the one end of the housing through the bore of the tube, it has been cooled by heat exchange flow relation with the inbound fluid materials.

Typically, the chemical reforming apparatus of this invention operates with water as an ingredient, typically in the form of supercritical steam. Specifically with carbonaceous materials such as coal, a fluid organic material provided to the system through the first port means is an oil slurry of coal containing typically sixteen to twenty percent of coal, so as to be fluid. This input mixture may contain up to about fifty percent by weight of water, based of the coal present, if it is desired to convert a maximum amount of the coal present to oil. However, if that much water is added to the coal oil slurry in the initial mixture passed through the first port means, one may obtain some "burping" resulting from slugs of vaporizing water. Thus a preferred technique of providing water to the system is to directly provide it to the heated, opposed end area as steam, to serve as a reactant for the coal or other desired organic materials. Typically, the maximum temperature that the fluid material for a reaction encounters should be above 376° C., a temperature at which water normally begins to dissociate and thus becomes strongly chemically reactive, although it is contemplated that with certain catalysts the reaction temperature might be lower, for example 350 degrees. For the production of oil, the maximum temperature of the system typically is not allowed to go above 430 degrees C., because above such temperatures, large amounts of organic gas are formed and lower percentages of oil. Of course, if it is the gas that is desired, then the maximum operating temperature of the system may be substantially above 430 degrees.

The system may be operated under significant amounts of pressure. However, pressure is not strongly critical in many circumstances, except that it is generally preferred to operate at a pressure of at least about 50 p.s.i. and typically about 150 p.s.i. to avoid the formation of large bubbles, which might interfere with the transport of solid components of the fluid material through the system. There appears to be no practical upper limit for the pressure used, and the apparatus will operate at pressures of 30 p.s.i. or effectively ambient pressures, subject to the problem of the creation of excessively large bubbles.

The apparatus of this invention may also be used to process any organic materials into oil and gas, for example municipal solid waste, paper, sewage, slaughterhouse or food processing waste, plastic, sawdust, tree branches, leaves, grass clippings and the like. The amount of water added is preferably adjusted in a manner responsive to the degree of oxygenation and hydrogenation of the input materials. In other words, generally more water will be added to a coal ingredient to provide desired hydrogenated products than will be added to an input material comprising paper, garbage, or grass clippings, since such materials already are highly hydrogenated and oxygenated.

Preferably, the second access port may comprise an oil and gas-storing receptacle which carries separate gas-venting and oil-removing ports. For example, the oil and gas-storing receptacle may communicate with the bore of the tube described above by a conduit which extends upwardly through and from the housing, so that gasses and pressurized liquid will move upwardly into the receptacle, but solids will not. Then, the gas may be bled off by a valved port extending upwardly from the receptacle, while oil is tapped off by a lower valved port in the receptacle. However, other separation techniques may also be used.

Preferably, a downwardly-extending dead leg conduit is also provided through the housing adjacent the one end of the tube, to receive solid materials from the bore of the rotating tube. Thus, products and byproducts of the process of this invention may be continuously collected, as a continuous flow of organic materials passes through the system.

Typically, the organic materials passed through the system are fluidized with oil to any degree necessary to assure free flow of the materials through the system.

Thus, by this invention, organic materials may be chemically reformed, typically by advancing an oil-fluidized organic material within a tubular housing from a cool end to a heated end of the housing and back again. The effect of this is to heat the organic material at the heated end to a reaction temperature, followed by withdrawing the heated organic material from the heated end toward the cool end in countercurrent, heat-exchange relation with more of the advancing organic material. Then, one removes the withdrawn organic material from the housing at a position adjacent the cool end.

Preferably, as previously stated water, typically as steam, is added to the organic material adjacent the heated end, the temperature of the organic material at the heated end being usually sufficient to cause the water as supercritical steam to chemically react with the organic material.

By this invention, one may chemically reform halogenated organic materials, if desired in a mixture with other organic materials for processing, and typically diluted with a carrier oil, which method comprises advancing through a process path a fluid mixture of halogenated, organic material such as polyvinylchloride plastic, dioxin, trichloroethylene, Freons, or other halogenated solvents or plastics. The fluid mixture includes or is in contact with an electron donating material, with the mixture being advanced along the process path that comprises a heating section. By this heating section one raises the fluid mixture to a temperature at which at least most of the halogen atoms of the organic material are converted to halide. For example, in the presence of metals such as calcium, magnesium, aluminum or iron, each of those materials will donate electrons at an appropriate reaction temperature of, for example, 250 to 400 degrees C. so that carbon bonded chlorine atoms may be converted to chloride. Aluminum and iron can donate electrons to the halogen atoms to convert them to the halide, with the resultant formation of aluminum chloride or iron chloride. Thus, ground up, non-toxic scrap metals such as aluminum and steel cans, a so-called "waste product", may be added to the fluid mixture in accordance with this invention to convert carbon bonded chlorine atoms to the harmless chloride form, thus eliminating the halogenated organic materials, which up to the present time must be otherwise dealt with elaborate and costly disposal methods because of their long persistence in the environment, their toxicity, and their accumulation in the tissues of animals and people.

Other materials which can be added to effect the reaction include alkali metal or alkaline earth oxides or hydroxides such as sodium hydroxide, calcium oxide or hydroxide, or magnesium oxide or hydroxide.

DESCRIPTION OF SPECIFIC EMBODIMENTS

Figure 1:
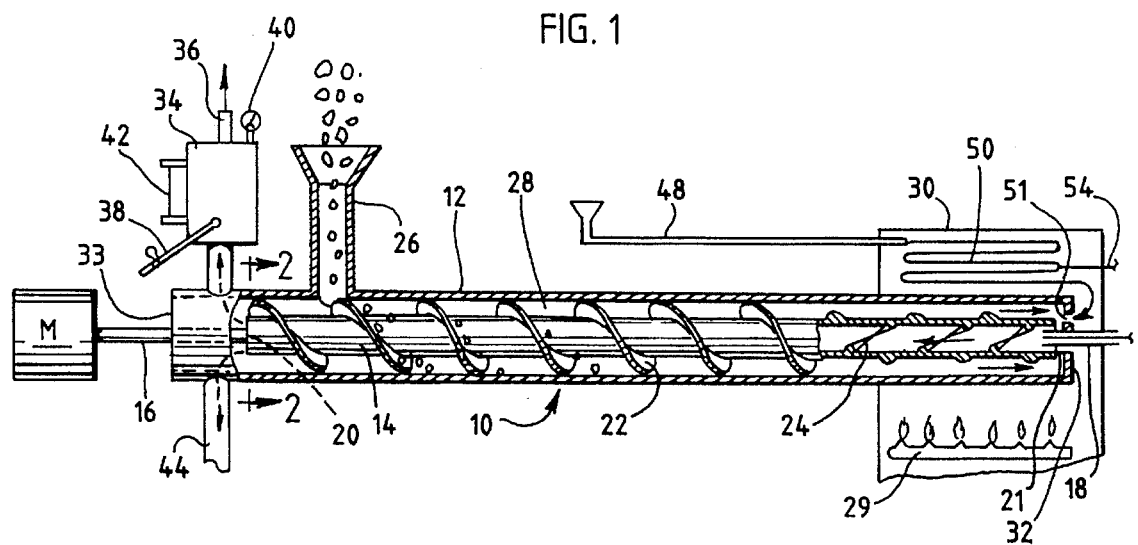
FIG. 1 is a transverse sectional view of an apparatus for chemically reforming organic materials.
Figure 2:
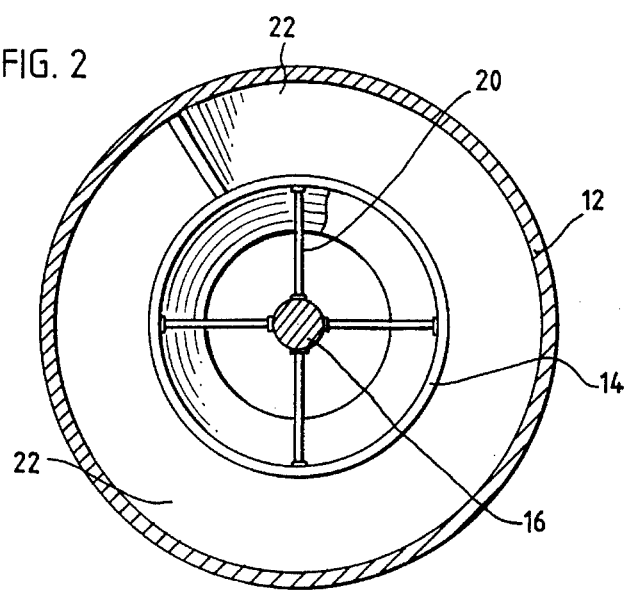
FIG. 2 is an enlarged sectional view taken along line 2—2 of FIG. 1.

Referring to the FIGS. 1 and 2, apparatus 10 for the chemical reforming of organic materials is provided, which comprises the following. A tubular housing 12 carries in its bore an open-ended stainless steel tube 14, optionally lined with a protective layer and rotatably mounted on shafts 16, 18 through apertures in housing 12, with shafts 16, 18 being connected to the inner wall of tube 14 by spider supports 20, 21. Shaft 16, connects to motor M for rotation so that tube 14 may be rotated as desired.

Tube 14 carries an external spiral vane 22 about its outer surface as shown, to serve as an auger drive to convey materials through the length of housing 12.

Tube 14 also defines an internal spiral vane 24 extending from the inner wall of tube 14 in the opposite spiral sense from spiral vane 22, to serve as a further propulsion means for fluid materials in the system, passing through the bore of tube 14.

Thus, fluid materials such as a slurry of 10 to 25 (e.g. 18 percent) coal by weight in an oil (such as used motor oil) can be inserted into the system through the first access port 26. Access port 26 is generally schematically shown, but it may comprise a metering system such as a lock hopper of a star wheel of generally conventional design, for control of the amounts of solids to be inserted into the system. Liquids may be added by a metering pump.

First access port 26 communicates with the tubular space 28 between tubular housing 12 and tube 14. In this embodiment, motor M rotates tube 14 in a clockwise manner from the viewpoint of motor M, to urge fluid materials in tubular space 28 to the right, away from motor M and first access port 26, down the length of tubular housing 12.

A conventional oil or gas burner system 29, positioned within a fire box 30, is provided at the end 32 of housing 12 which is opposed to the end of the housing facing motor M. The opposed end portion 32 of housing 12 may be strongly heated at a desired rate to heat the entire system.

Thus, as tube 14 is rotated in clockwise manner and as fluidized organic materials pass through tubular space 28 toward opposed end 32 of the housing, materials which have been previously heated and are present in space 28 adjacent end 32 are forced into the bore of tube 14, where they are captured by internal spiral vane 24 and urged to flow back toward the first end 33 of housing 12, from where they originally came through access port 26. As the heated material in the bore of tube 14 flows to the left, it flows by more cool input material from first access port 26 moving outside of tube 14 to the right, so as to engage in countercurrent heat exchange with such material through tube 14. Thus, the material flowing to the right in tubular space 28 arrives at end 32 in heated condition, while the output fluid material flowing through the bore of tube 14 arrives at end 33 in cooled manner.

The system of flowing fluid may be pressurized by adding pressurized air or oil through access port 26, for example, so that fluids and gasses may be forced to enter into lock hopper 34, from where gasses may be vented through upper valve outlet 36 and oils may be tapped to flow through vented tap 38, in a manner as indicated by pressure gauge 40 and liquid level sight glass 42. On the other hand, solid materials may drop through valved dead leg conduit 44, to at least partially separate the solid, liquid, and gaseous product components of the apparatus of this invention.

It is preferred to provide water in the form of steam to the system at a point where the reacted materials are hot, although water may be added through port 26 with material for processing. Pressurized water from a supply source such as a simple tap 46 may pass through conduit 48 into fire box 30, there having a section 50 that extends through the fire box in serpentine manner so that the water may be heated to steam and driven by the water pressure along conduit 48 into the heated space within housing 12 through aperture 51. There, the live steam mixes with the other reactants, preferably at a temperature above 376 degrees C. at which the water molecules tend to dissociate, to serve as a reactant and source of hydrogen for the other organic materials being reformed, such as coal, garbage, or the like. Thermocouple 54 may measure system temperatures for control of the process.

The maximum temperature of the reaction flow system is of course adjacent end 32 of the housing. Then, the heated material flows through the bore of rotating tube 14, impelled by internal spiral vane 24. At the hottest end of the reaction flow path, the temperature is high enough for typically a myriad of chemical reactions to take place, especially as cooling begins. However, as the system cools, reactions take place that typically favor the formation of oils and gasses, and then they cease, so that there is typically a net production of oils and gasses in the output product as found adjacent end 33 of the housing, when compared with the input reactant. These oils and gasses serve as useful fuels, among other uses, comprising a large variety of species of molecules.

As previously stated, if it is desired to maximize the production of oils, it is generally preferred to not exceed a maximum operating temperature adjacent end 32 of the housing of 430 degrees C. At temperatures higher than that the production of gasses will increase, which gasses also serve as useful fuels.

As another alternative, coal may be added to the system, particularly high sulfur coal, to yield a lower sulfur oil as a product. Another resulting product is a low sulfur, oil impregnated coal having a very high BTU upon burning. Most of the sulfur comes off as a gas. Thus, by this method and apparatus, high sulfur coal can be turned into environmentally safer, useful, high BTU combustion products.

The apparatus of this invention utilizes a relatively small amount of heat consumption as provided by burner 29, because the heat is largely regenerated between the output product and the input reactant. Thus, the apparatus operates in a very energy efficient manner.

If the organic input material added through first access port 26 contains halogenated material such as polyvinylchloride plastic or halogenated solvents, it is typically desirable to include in the slurry an electron donating material, for example finely ground-up, recycled cans or other scrap metal in a stoichiometric amount, or preferably in an excess to the amount of chemically bonded chlorine present. Alkali conditions can accelerate the reaction. The resulting product can be expected to be of greatly diminished carbon-bonded chlorine content.

If the residue of carbon-bonded chlorine remains too high, the product may be sent through another processing apparatus similar to the apparatus of this invention, for further chemical purifying and reduction of chlorine to chloride. If desired, steel and aluminum may be used as an initial "reagent" for reforming most of the chemically bonded chlorine to chloride, followed by a "clean-up" second processing using, if necessary, calcium or magnesium metal which, of course, is highly reactive to chlorine, quantitatively converting it to chloride.

Figure 3:
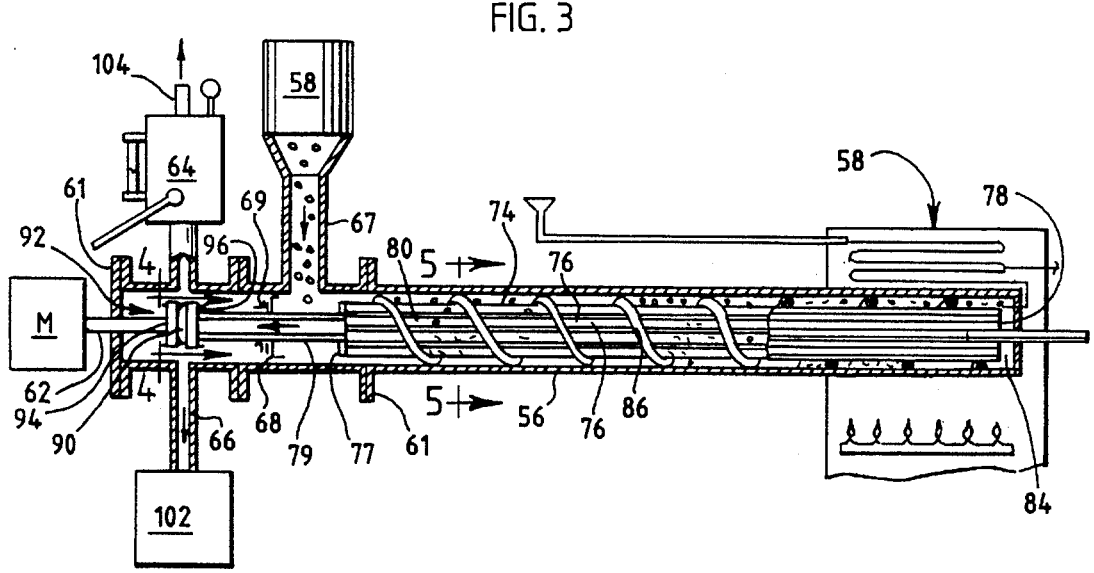
FIG. 3 is a transverse sectional view of another embodiment of the apparatus of this invention for chemically reforming organic materials.
Figure 4:
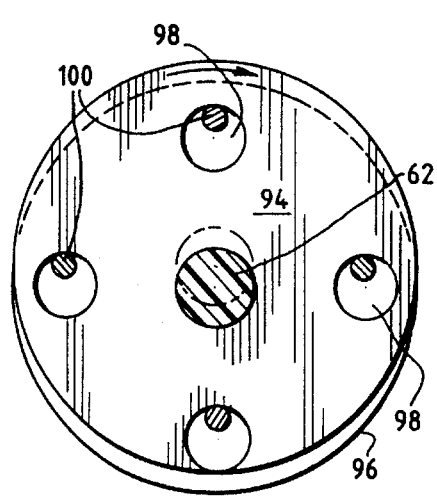
FIG. 4 is an enlarged sectional view taken along line 4—4 of FIG. 3.
Figure 5:
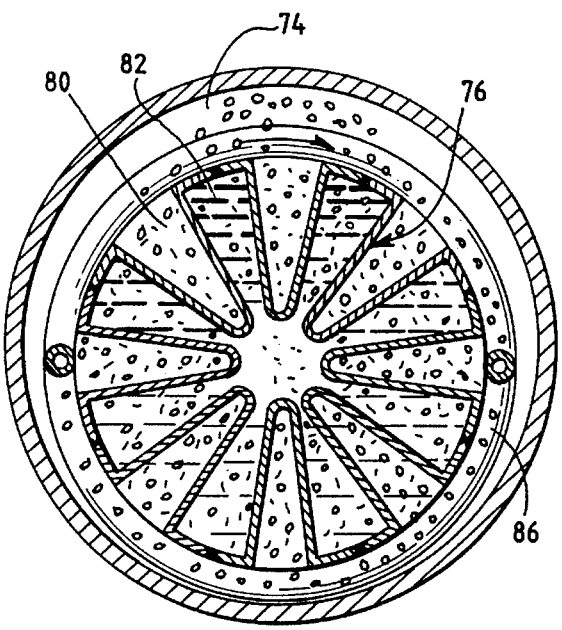
FIG. 5 is an enlarged sectional view taken along line 5—5 of FIG. 3.

Referring to FIGS. 3–5, outer tubular housing 56 is provided, carrying at one end thereof a housing heating system which is of similar design to the heating system of the previous embodiment, so a second description thereof is unnecessary.

Inflowing material may be provided through a flow pump and pressurizing system 58 which may be of conventional design, the flowing material being provided to inflow unit 67. The flow material passes in this embodiment through the space 74 between tubular housing 56 and an inner, rotatable, convoluted reactor tube 76, along the length of reactor tube 76 away from inflow tube 67 to exit the end 78 thereof within the closed end of tubular housing 56.

Reactor tube 76 may be of a convoluted cross section as particularly illustrated in FIG. 5, so that a plurality of outer convoluted pockets 80 and inner convoluted pockets 82 are defined, extending along the entire length of reactor tube 76 to provide flow channels for material being processed both outside and inside of reactor tube 76.

The reaction material thus passes through space 74, as previously stated, to the end 78 of reactor tube 76, at which point the material from the outer pockets 80 can fill end space 84 and from there flow into the open ends of inner pockets 82, back along the interior of tube 76 in countercurrent heat exchange flow relation with the material in outer pockets 80.

A helical rod or tube 86 is wound about reactor tube 76, and serves to provide agitation and flow assistance to the materials in space 74. Tube 76 is rotated by motor M through shaft 62, in this case in a clockwise direction to cause rotation of helical rod 86 and added pumping action, above and beyond the effect of the pump in unit 58.

By the pumping pressure, materials within inner pockets 82 are advanced back again along reactor tube 76. Plate 77 closes off the near end of tube 76 so that the contents flow through tube 79, past inlet tube 67, into end space 90, including area between flanges 94, 96. From there, gas which has been formed rises into gas collecting chamber 64, while flowable liquid materials flow downwardly into outflow pipe 66.

Pressure pipe flanges 61 are shown, with reactor tube 76 being rotated by motor M through a solid power shaft. Outflow materials pass to either drop through outlet line 66 or gas collecting chamber 64. Stationary seal 68 engages rotating seal 69, which rotates on hollow power shaft 79 to provide the desired seal to separate inflowing reactant and outflowing product.

Power coupling 92 connects hollow power shaft 79 with the solid power shaft 62 in a manner also illustrated in FIG. 4. Solid power shaft 62 carries a first flange 94, while hollow power shaft 70 carries a second flange 96. Second flange 96, in turn, defines a plurality of pins 100, each of which occupies an aperture 98 which is carried in first flange 94. As shown, apertures 98 are of substantially larger diameter than pins 100.

As a result of this, as motor M rotates reactor tube 76, the second flange 96 and reactor tube 76 exhibit an amount of transverse play which is governed by the degree that apertures 98 are of larger diameter than pins 100. This continuous play provides an additional means to prevent the plugging up of the materials being processed in the apparatus as it operates.

If desired, fluid material outlet line 66 communicates with a second pump and a pressure-down unit 102, so that the materials are passed through the apparatus by the action of the pump of unit 58, the pump of unit 102, and helical pump action of helix 86. Also, a pressure-up unit of assembly 58 and the pressure down unit of assembly 102 (conventional items) may be used to operate the system at any desired pressure.

Gases may then be released by vent 104 as appropriate during the process.

Apart from the above, this embodiment of FIGS. 3–5 may function in a manner similar to that of the previous embodiment. As before, halogenated organic materials may be reformed to primarily hydrocarbon and chloride materials as previously described.

Thus, a process and apparatus is provided which, with substantial simplicity, converts organic materials into desirable products such as oil and gas fuel, plus oil impregnated carbon. As previously stated, sulfur can be removed from coal by this process as an extra dividend, improving its environmental acceptability. Also, the system operates with a low energy cost and, typically, at relatively low pressures.

The above has been offered for illustrative purposes only, and is not intended to limit the scope of the invention of this application, which is as defined in the claims below.

That which is claimed is:

1. Apparatus for chemical reforming of organic materials, which comprises:

a tubular housing having a longitudinal axis;

a tube comprising radially extending projections along essentially the entire length thereof, said tube being rotatably positioned in said tubular housing generally parallel to said axis to form a space therebetween; said radially extending projections comprising hollow, radially extending convolutions which define radially extending spaces both inside and outside of said tube;

a motor for rotating said tube;

first and second access ports adjacent one end of said housing communicating with the space between said tube and housing;

a water source for applying water to fluid material within said housing adjacent an opposed end of said tube and housing;

an apparatus for heating said housing adjacent said opposed end and spaced from said one end;

said tube and housing defining a flow conduit system for causing fluid material within said housing to move in a path between said first and second access ports.

2. The apparatus of claim 1 in which a helical member is carried on said tube and extends essentially along the entire length of said tube, said helical member comprising at least part of said means for causing said fluid to move.

3. The apparatus of claim 2 in which said motor for rotating said tube comprises a motor having a rotary shaft, said tube having a rotary driving shaft which is driven by said rotary shaft, but connected thereto in a manner to permit lateral play therebetween, whereby said tube exhibits a degree of lateral motion relative to said rotary shaft during rotation.

4. The apparatus of claim 3 in which said rotary driving shaft and rotary shaft each carry a radially extending flange, one of said flanges carrying pins which extend in loosely-fitting manner through apertures of the other of said flanges to permit said lateral play.

5. The apparatus of claim 2 in which the apparatus provided for heating said housing comprises a flame heater positioned within a firebox, said firebox surrounding said opposed end.

6. The apparatus of claim 5 in which a pressurized steam supply line extends in serpentine manner through said firebox into communication with the bore of said tube.

7. The apparatus of claim 1 in which said water source applies steam within said housing adjacent to said opposed end.

8. The apparatus of claim 1 in which said motor for rotating said tube comprises a motor having a rotary shaft, said tube having a rotary driving shaft which is driven by said rotary shaft, but connected thereto in a manner to permit lateral play therebetween, whereby said tube exhibits a degree of lateral motion relative to said rotary shaft during rotation.

9. The apparatus of claim 8 in which said rotary driving shaft and rotary shaft each carry a radially extending flange, one of said flanges carrying pins which extend in loosely-fitting manner through apertures of the other of said flanges to permit said lateral play.

10. The apparatus of claim 1 in which the path between the first and second access ports extends in one portion outside of said tube and in another portion inside of said tube.

11. Apparatus for chemical reforming of organic materials, which comprises:

a tubular housing having open ends and a longitudinal axis;

a tube comprising radially extending hollow projections along essentially the entire length thereof, said tube being rotatably positioned in said tubular housing generally parallel to said axis to form a space therebetween;

a motor for rotating said tube;

first and second access ports adjacent one end of said housing communicating with the space within said housing;

said tube extending within said housing for permitting fluid material within said housing to move in a path between said first and second access ports, said path extending in one portion outside of said tube between said projections and in another portion inside of said tube within said projections, said path crossing one end of said tube.

12. The apparatus of claim 11 further comprising a heater for heating said housing adjacent said opposed end and spaced from said one end.

13. The apparatus of claim 11 further comprising a source for applying water to fluid material within the housing adjacent said opposed end.

14. The apparatus of claim 11 in which said radially extending projections comprise hollow, radially extending convolutions which define radially extending spaces both inside and outside of said tube.

15. The apparatus of claim 14 in which said motor for rotating said tube comprises a motor having a rotary shaft, said tube having a rotary driving shaft which is driven by said rotary shaft, but connected thereto in a manner to permit lateral play therebetween, whereby said tube exhibits a degree of lateral motion relative to said rotary shaft during rotation.

16. The apparatus of claim 15 in which said rotary driving shaft and rotary shaft each carry a radially extending flange, one of said flanges carrying pins which extend in loosely-fitting manner through apertures of the other of said flanges to permit said lateral play.

17. The apparatus of claim 16 having apparatus for heating said housing, said apparatus comprising a flame heater positioned within a firebox, said firebox surrounding said opposed end, and a pressurized steam supply line extending in serpentine manner through the firebox into communication with the bore of said tube.

18. The apparatus of claim 14 in which a helical member is carried on said tube, and extends essentially along the entire length of said tube, said helical member causing said fluid to move as the tube rotates.

* * * * *